United States Patent [19]
Peyrot

[11] 3,743,812
[45] July 3, 1973

[54] SELF-CENTERING CLAMP FOR BUTT-WELDING TUBES

[76] Inventor: Jean-Pierre Peyrot, 1, Avenue de la Division du General Leclerc, Villejuif, France

[22] Filed: Aug. 16, 1971

[21] Appl. No.: 171,877

[30] Foreign Application Priority Data
Aug. 18, 1970 France .............................. 7030356

[52] U.S. Cl. .............. 219/60 A, 219/61, 219/125 R
[51] Int. Cl. ............................................... B23k 9/02
[58] Field of Search ................. 219/60 A, 60 R, 61, 219/124, 125 R, 161, 159, 131 F

[56] References Cited
UNITED STATES PATENTS
2,795,689  6/1957  McNutt ....................... 219/60 A X
3,409,752  11/1968  Henderson et al ................ 219/60 A
2,013,630  9/1935  Goldsborough ................... 219/60 A Primary Examiner—J. V. Truhe
Assistant Examiner—L. A. Schutzman
Attorney—Karl W. Flocks

[57] ABSTRACT

Self-centering welding clamp fitted with a rotating drum on which a filler-metal wire supply reel or spool is designed to feed the weld ahead of the electrode, said wire being driven by knurled wheels at a certain speed in one direction or another between an angled coupling connected to the fixed body of the clamp and a flexible sheath embedded inside the rotating drum by means of a system of synchronization between the motor of the drum and that of the knurled wheels in order to permit, in butt-welding two tubes by circular welding, to recharge the weld as desired with filler-metal.

1 Claim, 3 Drawing Figures

Patented July 3, 1973 3,743,812

Inventor:
Jean-Pierre Peyrot
By Karl W. Flocks
attorney

Patented July 3, 1973 3,743,812

SELF-CENTERING CLAMP FOR BUTT-WELDING TUBES

The present invention relates to a self centering clamp for welding, and particularly suitable for butt-welding or end to end welding of two tubes.

In an apparatus of this type, a tool-carrier drum caused to rotate inside the clamp has a slot or slit which always stops at the same position where it is situated opposite the open jaws of the clamp, which enables rapid setting up or into position and rapid disengagement of the apparatus on the parts to be assembled.

The cables and piping or canalisations necessary for supplying the electrode wind round the rim of the tool-carrier drum the working travel or rotation of which is in the order of one or two turns.

The problem posed as regards supplying such a clamp with filling metal is that of being able to regulate the linear velocity at which the wire or cable winds or unwinds in such a way that, according to the requirements of the operator, the end of the wire or cable at the welding point or position is fed at a predetermined velocity whatever the direction in which the mobile drum of the clamp rotates around the parts to be welded.

Consequently, the present invention provides a device for synchronizing the supply of filling metal with the angular velocity of the drum, the reel or spool on which the filler metal wire is wound and the wire driver being integral with the fixed part of the clamp, a circular groove or canal in the periphery of the tool-carrier drum enabling the filler metal wire to be brought to the active end of the electrode with a precise degree of location, regulation of the driving velocity in relation to the angular velocity of the drum making it possible to determine as desired the rate of the filler-metal wire consumed in the welding.

Other characteristics and advantages will become evident from the description to follow made with regard to the attached drawings and describing an indicative, but in no way limitative form of embodiment of the invention.

Figures 1, 2:
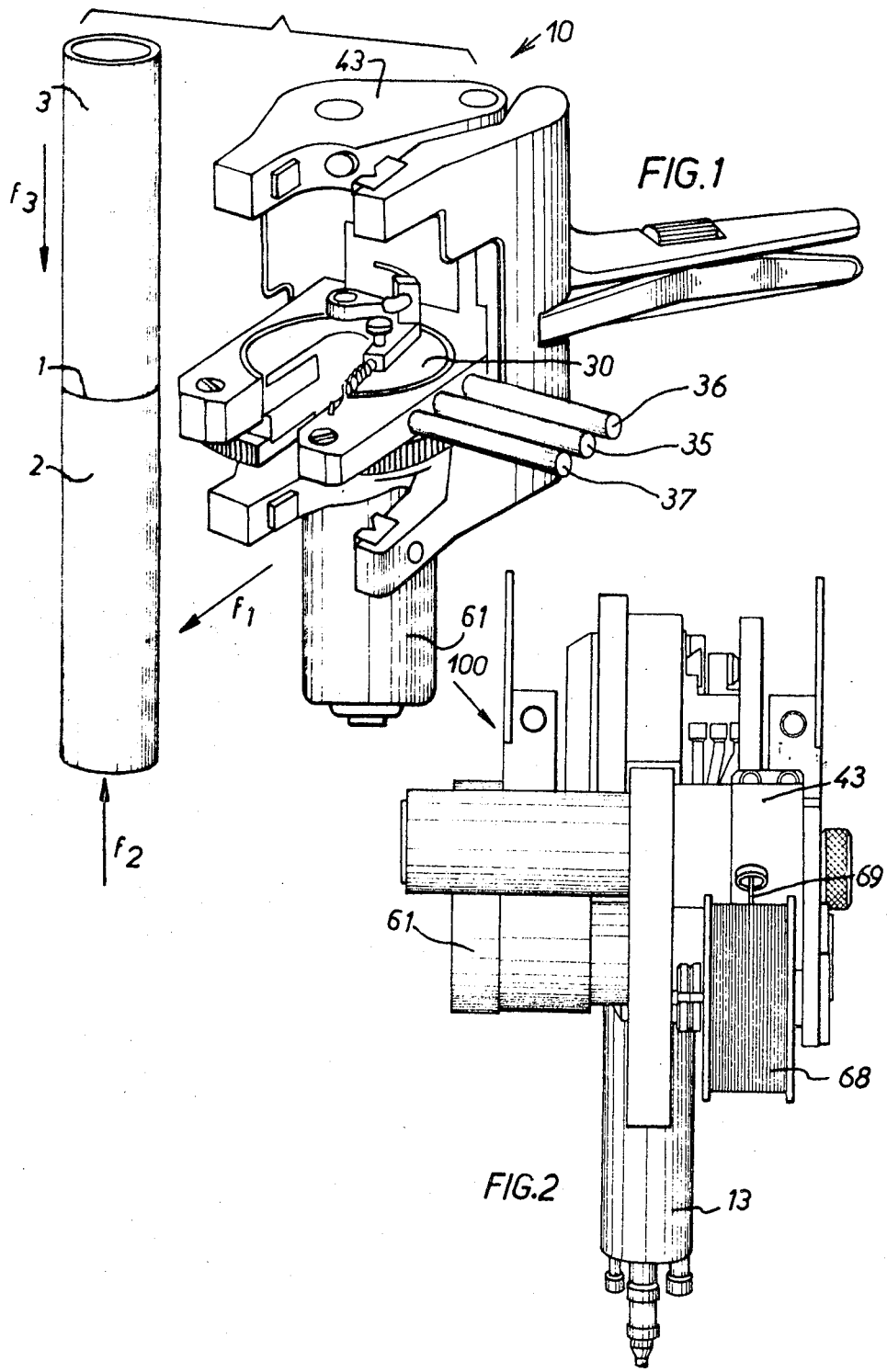
FIG. 1 is a perspective view of the butt-welding clamp of the main patent.
FIG. 2 is an elevation view of a welding clamp according to the invention.

FIG. 1 shows a clamp 10, manipulated by a handle 13, positioned for application to an assembly of two tubes 2 and 3 to be welded at 1.

FIG. 2 shows a similar clamp 100 according to the invention on which the body 43 has a spool or reel 68 loaded with a metal filler wire 69 which is to feed the circular butt welding in front of electrode 70 of the torch 28.

It can be seen that wire 69, on leaving reel 68, passes through a guide 71 and then between the two driving or feeding wheels 72 and 73 at least one of which is driven by a motor system or unit 74 and drives the wire. It next penetrates an angled tube 75 which comes out on a circular canal or groove situated on the periphery of the drum 30, at the level of a window or part 76.

Inside this canal is situated one end of a flexible sheath 77 the other end of which bears a rigid sheath 78 the adjustable position of which determines the precise point at which the filler-metal wire feeds the weld seam opposite the electrode 70.

The motor unit 61 which causes the drum to rotate during welding comprises a device for synchronizing the angular velocity of the drum 30 and the linear velocity of feeding of the wire 69 in such a way as to enable adjustment as desired of the rate at which the filler-metal is introduced into the bath.

The linear speed of the wire 69 can be suitably regulated in one direction or the other for the supply of wire to be zero in the nozzle 78. If the drum 30 rotates in the direction of arrow $f11$ at a linear velocity $\omega$ the wire must be driven in direction $f13$ at a velocity V such that, for one revolution of drum 30, the end 79 of the nozzle feeds a length of wire corresponding exactly to the perimeter described by the loop 80 shown in dotted lines and visible in the slot or slit 46.

On the other hand, if the drum rotates at the velocity $\omega$ in the direction of arrow $f12$, the driving device 74 must draw back wire 69 at this same velocity V in the direction of arrow $f14$.

A transmission by gears of a known type connecting the motor 61 of the drum to the driving system 74 thus makes it possible to stop the supply of wire at the level of electrode 70 whatever the direction in which the drum rotates.

Since the welding of the filler-metal wire always takes place for one rotation of the drum in the direction $f11$, any velocity of the wire 69 less than V in the direction $f13$ supplies nozzle 78 with a certain feeding rate of filler-metal which may be regulated as desired the weld using a motor device transmitting, through the intermediary of a differential mechanism, and additional movement in the desired direction to the driving wheels 72 and 73.

Figure 3:
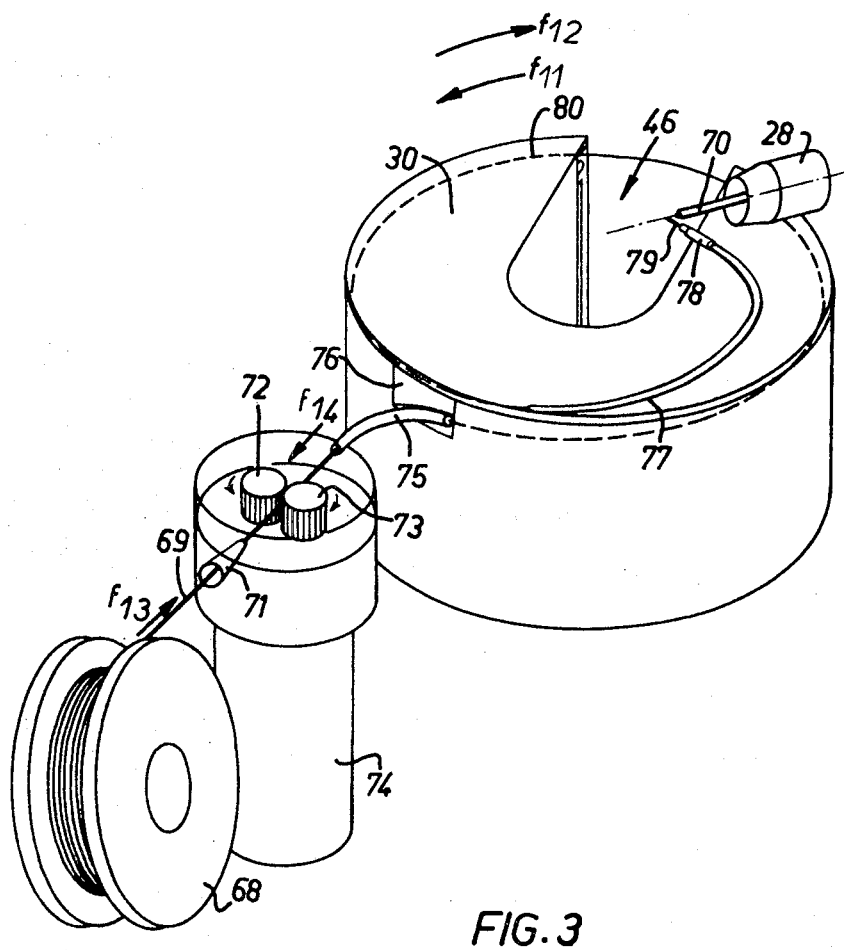
FIG. 3 is a perspective view of a detail of the device of FIG. 2.

As shown in FIG. 3, wire 69, initially introduced directly from the angled tube 75 into the flexible sheath 77, has effected a complete revolution. In certain welding techniques, a welding cycle under special atmosphere is effected firstly in direction $f12$, then a welding cycle is effected in the opposite direction $f11$ with filler-metal.

It is understood that the present invention has been described above as an indicative, but in no way limitative preferred form of embodiment and that any equivalent means can be introduced into its constituent elements without departing from its scope defined by the attached claims.

I claim :

1. A self-centering welding clamp comprising
   support body means for supporting the clamp,
   a rotating drum mounted for rotation on said support body means,
   a welding torch mounted for movement with said rotating drum,
   and means for feeding filler-metal wire at said welding torch at a predetermined speed regardless of direction and speed of rotation of said drum including
   said above mentioned rotating drum,
   supply reel means to supply filler-metal wire mounted on said support body means,
   motor means to drive said drum connected to said drum and mounted on said support body means,
   angled coupling means connected to said support body means to feed the filler-metal wire to said rotating drum, a pair of friction roller means for feeding the wire to said rotating drum through said angled coupling means at a variable speed during rotation of said drum in one direction and for withdrawing the wire through said angled coupling means at a variable speed during rotation of said drum in an opposite direction including a pair of friction rollers,
and means connected to drive at least one of said pair of friction rollers,
and a flexible sheath means in said rotating drum to receive the wire passing between said angled coupling means and said sheath.

* * * * *

UNITED STATES PATENT OFFICE
CERTIFICATE OF CORRECTION

Patent No. 3,743,812      Dated July 3, 1973

Inventor(s) Jean-Pierre Peyrot

It is certified that error appears in the above-identified patent and that said Letters Patent are hereby corrected as shown below:

On the cover sheet under item [30] insert the following Foreign Application Priority Data:

December 4, 1970    France    70 43793

Signed and sealed this 26th day of March 1974.

(SEAL)
Attest:

EDWARD M. FLETCHER, JR.
Attesting Officer

C. MARSHALL DANN
Commissioner of Patents